(12) United States Patent
Burns et al.

(10) Patent No.: US 9,998,544 B2
(45) Date of Patent: Jun. 12, 2018

(54) SYNCHRONIZATION TESTING OF ACTIVE CLUSTERED SERVERS

(71) Applicant: SAS Institute Inc., Cary, NC (US)

(72) Inventors: Michael Kent Burns, Leander, TX (US); Gregory Ivan Grimes, Cedar Park, TX (US)

(73) Assignee: SAS Institute Inc., Cary, NC (US)

( * ) Notice: Subject to any disclaimer, the term of this patent is extended or adjusted under 35 U.S.C. 154(b) by 450 days.

(21) Appl. No.: 14/689,164

(22) Filed: Apr. 17, 2015

(65) Prior Publication Data

US 2016/0041859 A1 Feb. 11, 2016

Related U.S. Application Data

(60) Provisional application No. 62/035,609, filed on Aug. 11, 2014.

(51) Int. Cl.
*H04L 29/08* (2006.01)
*G06F 11/20* (2006.01)

(52) U.S. Cl.
CPC ............ *H04L 67/125* (2013.01); *G06F 11/20* (2013.01); *H04L 67/1095* (2013.01)

(58) Field of Classification Search
CPC ......... G06F 17/30174; G06F 17/30194; G06F 17/30575; G06F 17/30581
See application file for complete search history.

(56) References Cited

U.S. PATENT DOCUMENTS

| 2003/0192028 | A1* | 10/2003 | Gusler | G06Q 10/10 717/101 |
| 2004/0024795 | A1* | 2/2004 | Hind | G06F 17/30581 |
| 2008/0281938 | A1* | 11/2008 | Rai | G06F 15/177 709/209 |
| 2011/0026513 | A1* | 2/2011 | Tien | G06F 17/30575 370/350 |
| 2012/0209808 | A1* | 8/2012 | Tien | H04L 67/1095 707/622 |

OTHER PUBLICATIONS

Wolfe et al., Enhance Your High Availability Story by Clustering Your SAS® Metadata Server in SAS® 9.4, SAS Global Forum 2013, Systems Architecture and Administration, Paper 468-2013, 2013, pp. 1-9.

* cited by examiner

*Primary Examiner* — Jigar Patel
(74) *Attorney, Agent, or Firm* — Bell & Manning, LLC

(57) ABSTRACT

In a computing device that performs synchronization testing of a plurality of active clustered servers, a request to check synchronization between slave data stored and master data is received. The request includes master synchronization test values computed by a master node that include a number of records included in a dataset and a sum of modification time values for the records. Slave synchronization test values are computed that include a number of records included in the dataset of the slave data and a sum of modification time values for the records in the dataset of the slave data. The computed slave synchronization test values are compared to the master synchronization test values. A message is sent to the requesting device indicating the slave node is synchronized when the computed synchronization test values match or indicating the slave node is not synchronized when the computed synchronization test values do not match.

30 Claims, 9 Drawing Sheets

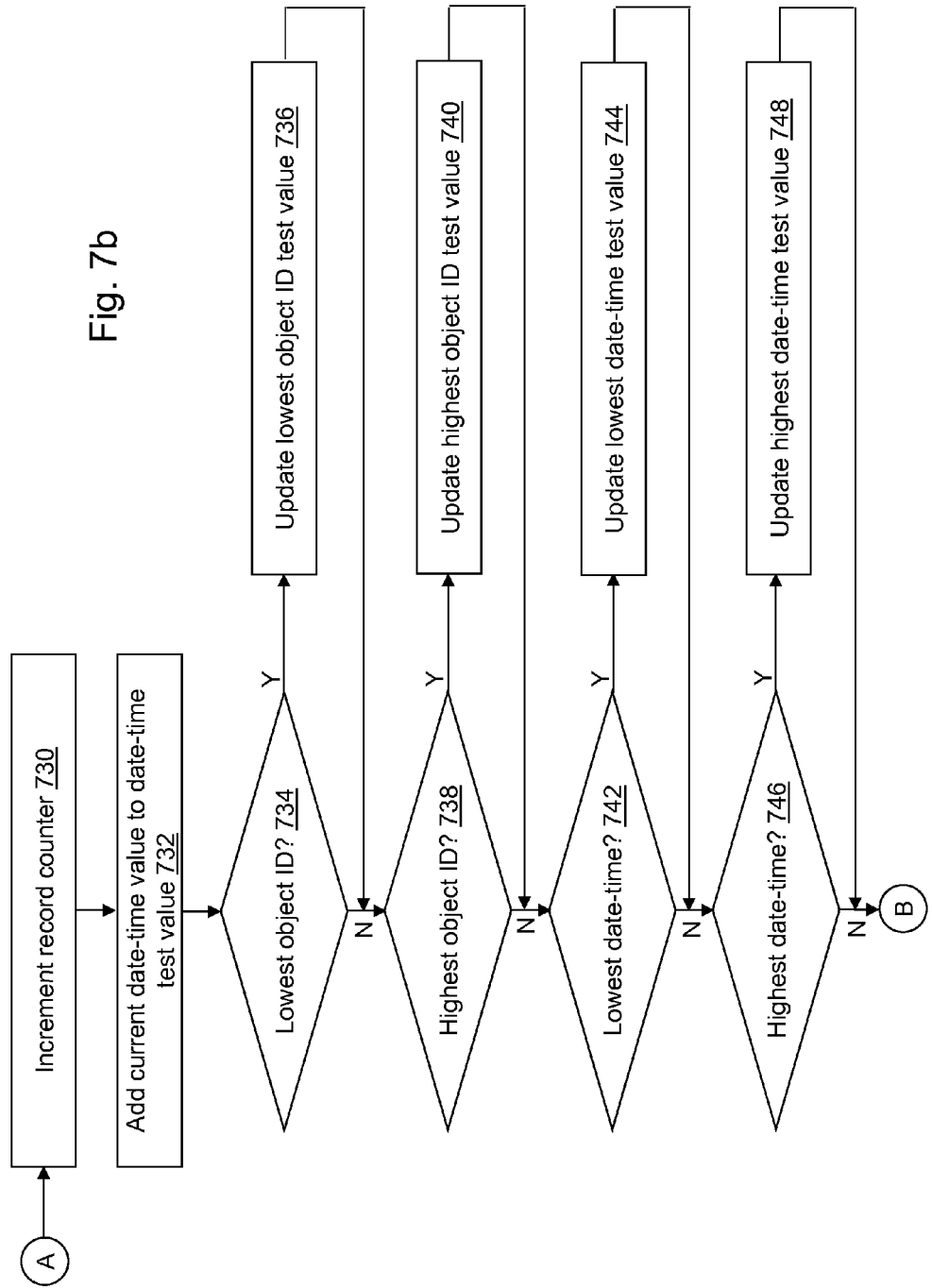

SYNCHRONIZATION TESTING OF ACTIVE CLUSTERED SERVERS

CROSS-REFERENCE TO RELATED APPLICATIONS

The present application claims the benefit of priority of 35 U.S.C. § 119(e) to U.S. Provisional Patent Application No. 62/035,609 filed Aug. 11, 2014, the entire contents of which are hereby incorporated by reference.

BACKGROUND

Clustering of server nodes that maintain separate copies of the same data can provide high-availability for critical applications by seamlessly continuing to handle requests to the data when a node fails.

SUMMARY

In an example embodiment, a computing device is provided that performs synchronization testing of a plurality of active clustered servers. The computing device includes, but is not limited to, a processor and a computer-readable medium operably coupled to the processor. The computer-readable medium has instructions stored thereon that, when executed by the processor, cause the computing device to perform synchronization testing of a plurality of active clustered servers. A request to check synchronization between slave data stored at a slave node and master data stored at a master node is received from a requesting device. The request includes master synchronization test values computed by the master node. The master synchronization test values include a number of records included in a dataset of the master data and a sum of modification time values for the records included in the dataset of the master data. Each modification time value of the modification time values for the records included in the dataset of the master data indicates a time that a respective record of the records included in the dataset of the master data was last modified. Slave synchronization test values are computed in response to receipt of the request. The slave synchronization test values include a number of records included in the dataset of the slave data and a sum of modification time values for the records in the dataset of the slave data. Each modification time value of the modification time values for the records in the dataset of the slave data indicates a time that a respective record of the records included in the dataset of the slave data was last modified. The computed slave synchronization test values are compared to the received master synchronization test values. A message is sent to the requesting device that indicates that the slave node is synchronized with the master node when the computed slave synchronization test values match the received master synchronization test values, or that indicates that the slave node is not synchronized with the master node when the computed slave synchronization test values do not match the received master synchronization test values.

In another example embodiment, a computer-readable medium is provided having stored thereon computer-readable instructions that when executed by a computing device, cause the computing device to receive a request to check synchronization between slave data stored at a slave node and master data stored at a master node from a requesting device. The request includes master synchronization test values computed by the master node. The master synchronization test values include a number of records included in a dataset of the master data and a sum of modification time values for the records included in the dataset of the master data. Each modification time value of the modification time values for the records included in the dataset of the master data indicates a time that a respective record of the records included in the dataset of the master data was last modified. Slave synchronization test values are computed in response to receipt of the request. The slave synchronization test values include a number of records included in the dataset of the slave data and a sum of modification time values for the records in the dataset of the slave data. Each modification time value of the modification time values for the records in the dataset of the slave data indicates a time that a respective record of the records included in the dataset of the slave data was last modified. The computed slave synchronization test values are compared to the received master synchronization test values. A message is sent to the requesting device that indicates that the slave node is synchronized with the master node when the computed slave synchronization test values match the received master synchronization test values, or that indicates that the slave node is not synchronized with the master node when the computed slave synchronization test values do not match the received master synchronization test values.

In yet another example embodiment, a method of performing synchronization testing of a plurality of active clustered servers is provided. In the method performed by a computing device, a request to check synchronization between slave data stored at a slave node and master data stored at a master node is received from a requesting device. The request includes master synchronization test values computed by the master node. The master synchronization test values include a number of records included in a dataset of the master data and a sum of modification time values for the records included in the dataset of the master data. Each modification time value of the modification time values for the records included in the dataset of the master data indicates a time that a respective record of the records included in the dataset of the master data was last modified. Slave synchronization test values are computed in response to receipt of the request. The slave synchronization test values include a number of records included in the dataset of the slave data and a sum of modification time values for the records in the dataset of the slave data. Each modification time value of the modification time values for the records in the dataset of the slave data indicates a time that a respective record of the records included in the dataset of the slave data was last modified. The computed slave synchronization test values are compared to the received master synchronization test values. A message is sent to the requesting device that indicates that the slave node is synchronized with the master node when the computed slave synchronization test values match the received master synchronization test values, or that indicates that the slave node is not synchronized with the master node when the computed slave synchronization test values do not match the received master synchronization test values.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 7a, 7b, 7c depict a flow diagram illustrating still further examples of operations performed by the node device of FIG. 2 in accordance with an illustrative embodiment.

DETAILED DESCRIPTION

Figure 1:
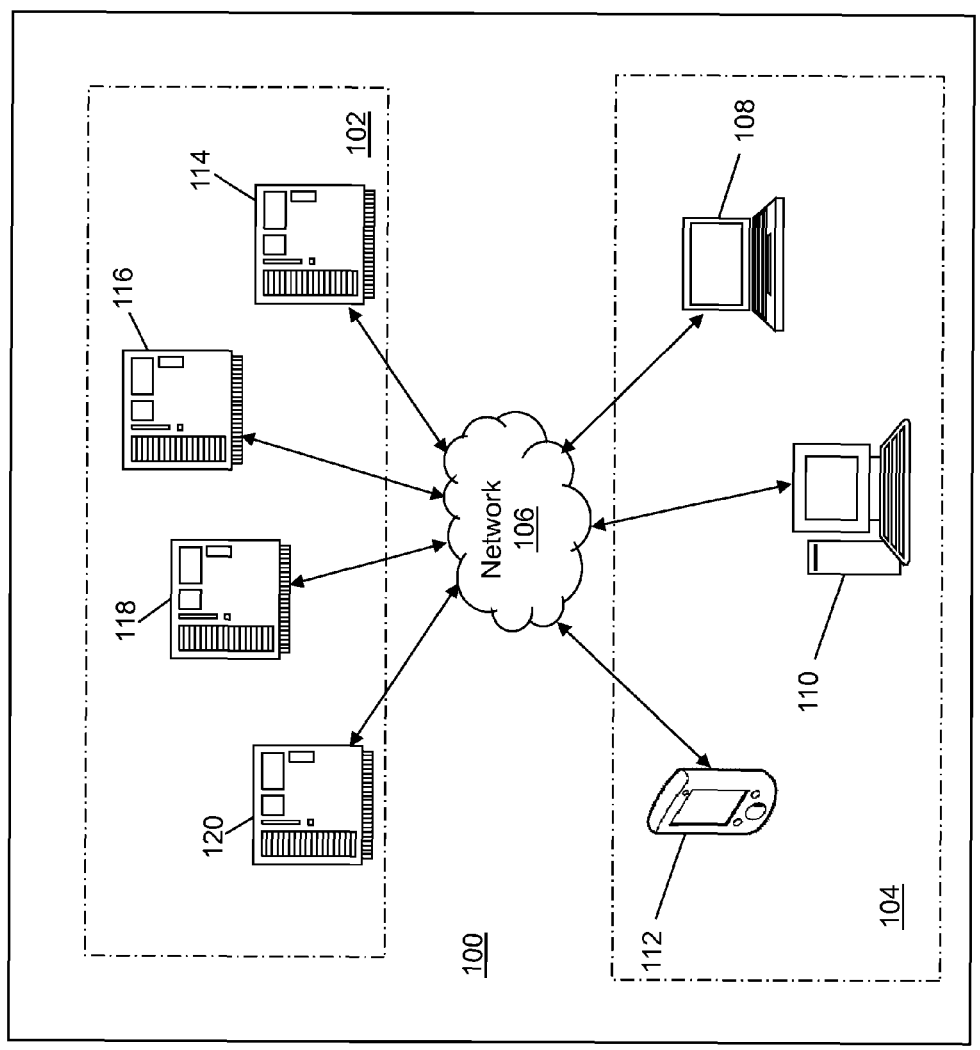
FIG. 1 depicts a block diagram of a data processing system in accordance with an illustrative embodiment.

Referring to FIG. 1, a block diagram of a data processing system 100 is shown in accordance with an illustrative embodiment. In an illustrative embodiment, data processing system 100 may include clustered server systems 102, data access systems 104, and a network 106. Clustered server systems 102 store data accessible by data access systems 104. When deployed across a cluster of computing devices, the SAS® Metadata Server, developed and provided by SAS Institute Inc. of Cary, N.C., USA, is an example implementation of clustered server systems 102.

Network 106 may include one or more networks of the same or different types. Network 106 can be any type of wired and/or wireless public or private network including a cellular network, a local area network, a wide area network such as the Internet, etc. Network 106 further may comprise sub-networks and consist of any number of devices.

The data access systems 104 can include any number and type of computing devices that may be organized into subnets. The computing devices of the data access systems 104 send and receive signals through network 106 to/from another of the one or more computing devices of the data access systems 104 and/or to/from the clustered server systems 102. The one or more computing devices of the data access systems 104 may include computers of any form factor such as a laptop 108, a desktop 110, a smart phone 112, a personal digital assistant, an integrated messaging device, a tablet computer, etc. The one or more computing devices of the data access systems 104 may communicate using various transmission media that may be wired and/or wireless as understood by those skilled in the art.

The clustered server systems 102 include a plurality of computing nodes. For illustration, each node of the plurality of computing nodes may be an independent physical or virtual computing device. The plurality of computing nodes work together so that each node stores a synchronized on disk or in-memory copy of the data for access by data access systems 104.

For illustration, FIG. 1 represents the clustered server systems 102 with a first server computer 114, a second server computer 116, a third server computer 118, and a fourth server computer 120. Clustered server systems 102 can include any number and type of computing devices that may be organized into subnets. The computing devices of the clustered server systems 102 send and receive signals through network 106 to/from another of the one or more computing devices of the clustered server systems 102 and to/from the data access systems 104. The one or more computing devices of the clustered server systems 102 may include computers of any form factor. The one or more computing devices of the clustered server systems 102 may communicate using various transmission media that may be wired and/or wireless as understood by those skilled in the art.

At any given time, one node of the plurality of computing nodes of clustered server systems 102 is designated as a master node. The master node may be responsible for coordinating data updates across the nodes of the clustered server systems 102. The master node may also coordinate the addition of or removal of any node to or from the clustered server systems 102 due to configuration changes, failure of a node, administrator actions, etc. The master node may be chosen each time the clustered server systems 102 are started and may change over time. For example, the first node to start may become the master node, although synchronization and failure recovery rules may cause another node to be chosen as the master node at a later time.

Nodes of the plurality of computing nodes other than the master node may be termed slave nodes. Slave nodes have a connection to the master node, but may be unaware of other slave nodes. For example, third server computer 118 may be designated as the master node of the clustered server systems 102, and first server computer 114, second server computer 116, and fourth server computer 120 may be designated as slave nodes of the clustered server systems 102 though this designation may change over time. The computing nodes that comprise the clustered server systems 102 may change over time as nodes fail or are brought offline as understood by a person of skill in the art.

A computing device of the data access systems 104 can connect to any node of the clustered server systems 102. For example, desktop 110 may connect to second server computer 116. The clustered server systems 102 may use a load balancing algorithm to control access to the clustered server systems 102, which means that any connection from a computing device of the data access systems 104 can be redirected to another node of the clustered server systems 102. Redirections to another node may be invisible to the computing device of the data access systems 104, and the computing device of the data access systems 104 may be unaware that the clustered server systems 102 includes the plurality of computing nodes instead of being implemented on a single computing device.

Figure 2:
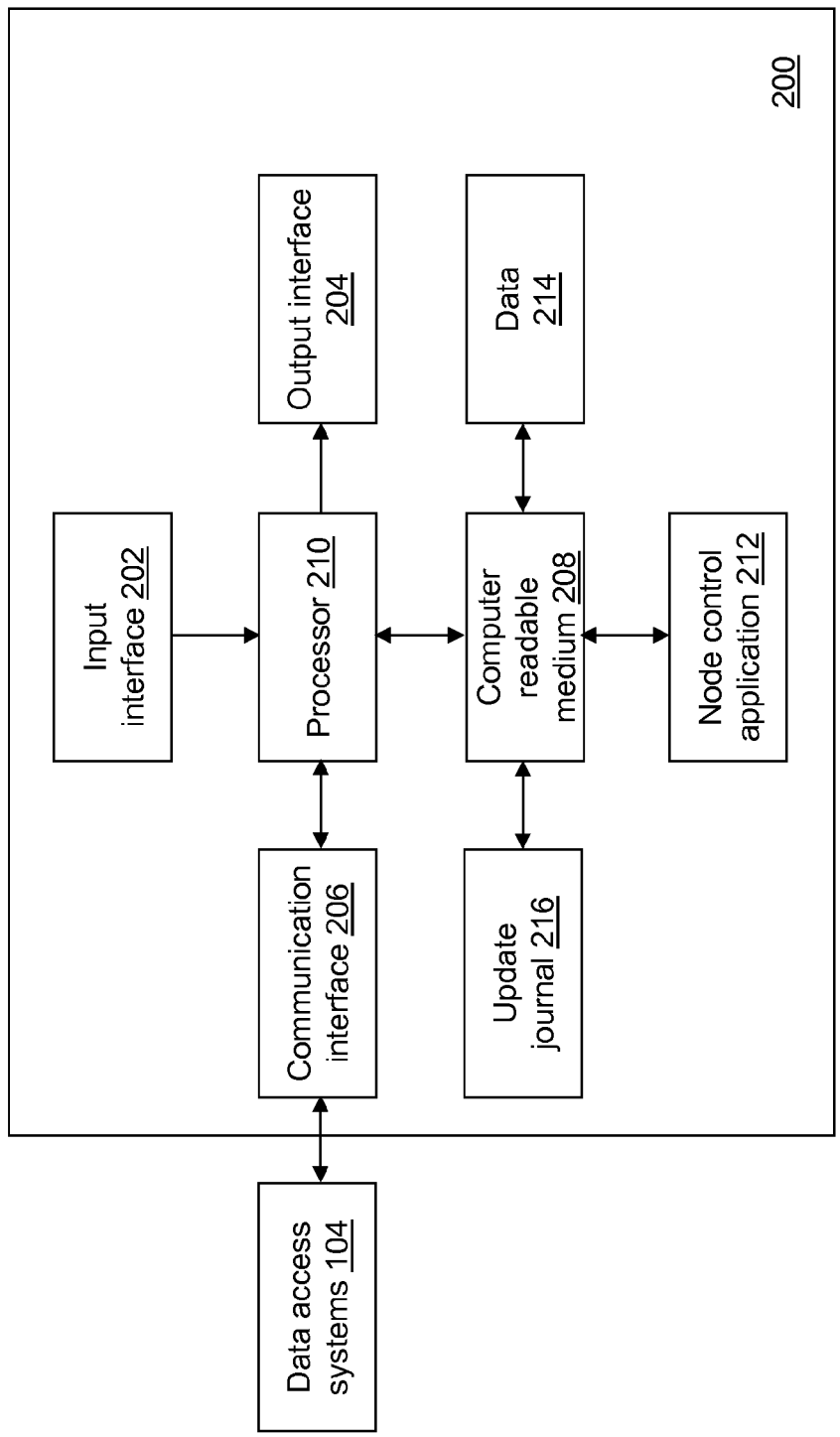
FIG. 2 depicts a block diagram of a node device of clustered server systems of the data processing system of FIG. 1 in accordance with an illustrative embodiment.

Referring to FIG. 2, a block diagram of a node device 200 of the clustered server systems 102 is shown in accordance with an illustrative embodiment. Node device 200 is an example computing device of the clustered server systems 102 and may be embodied by first server computer 114, second server computer 116, third server computer 118, fourth server computer 120, etc. Node device 200 may include an input interface 202, an output interface 204, a communication interface 206, a computer-readable medium 208, a processor 210, a node control application 212, data 214, and an update journal 216. Fewer, different, and additional components may be incorporated into node device 200, and each node device may include different components. In an illustrative embodiment, each node device 200 included in the clustered server systems 102 may use the same operating system.

Input interface 202 provides an interface for receiving information from the user for entry into node device 200 as understood by those skilled in the art. Input interface 202 may interface with various input technologies including, but not limited to, a keyboard, a mouse, a microphone, a display, a track ball, a keypad, one or more buttons, etc. to allow the user to enter information into node device 200 or to make selections presented in a user interface displayed on the display. The same interface may support both input interface 202 and output interface 204. For example, a display comprising a touch screen provides user input and presents output to the user. Node device 200 may have one or more input interfaces that use the same or a different input interface technology. The input interface technology further may be accessible by node device 200 through communication interface 206.

Output interface 204 provides an interface for outputting information for review by a user of node device 200 and/or for use by another device or application. For example, output interface 204 may interface with various output technologies including, but not limited to, a display, a speaker, a printer, etc. Node device 200 may have one or more output interfaces that use the same or a different output interface technology. The output interface technology further may be accessible by node device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Node device 200 may have one or more communication interfaces that use the same or a different communication interface technology. For example, node device 200 may support communication using an Ethernet port, a Bluetooth antenna, a telephone jack, a USB port, etc. Data and messages may be transferred between node device 200 and data access systems 104 and between other nodes of the clustered server systems 102 within the cluster using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Node device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Node device 200 also may have one or more drives that support the loading of a memory media such as a CD, DVD, an external hard drive, etc. One or more external hard drives further may be connected to node device 200 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Node device 200 may include a plurality of processors that use the same or a different processing technology.

Node control application 212 performs operations associated with responding to access requests to data 214 by one or more computing device of the data access systems 104. Some or all of the operations described herein may be embodied in node control application 212. The operations may be implemented using hardware, firmware, software, or any combination of these methods. Referring to the example embodiment of FIG. 1, node control application 212 is implemented in software (comprised of computer-readable and/or computer-executable instructions) stored in computer-readable medium 208 and accessible by processor 210 for execution of the instructions that embody the operations of node control application 212. Node control application 212 may be written using one or more programming languages, assembly languages, scripting languages, etc.

Node control application 212 may be implemented as a Web application. For example, node control application 212 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data 214 is stored in computer-readable medium 208 of each node device 200 included in the clustered server systems 102. Data 214 may be stored in a RAM or cache type of computer-readable medium 208 and/or in a ROM type of computer-readable medium 208.

Data 214 may be organized to include a plurality of rows and one or more columns though additional or fewer dimensions may be used. Data 214 may include any type of content represented in any computer-readable format such as binary, alphanumeric, numeric, string, markup language, metadata, etc. The content may include textual information, graphical information, image information, audio information, numeric information, metadata, etc. that further may be encoded using various encoding techniques as understood by a person of skill in the art. Data 214 may be stored using various formats as known to those skilled in the art including a file system, a relational database, a system of tables, a structured query language database, etc. In an illustrative embodiment, data 214 is metadata used by one or more applications executing at the data access systems 104.

Figure 3:
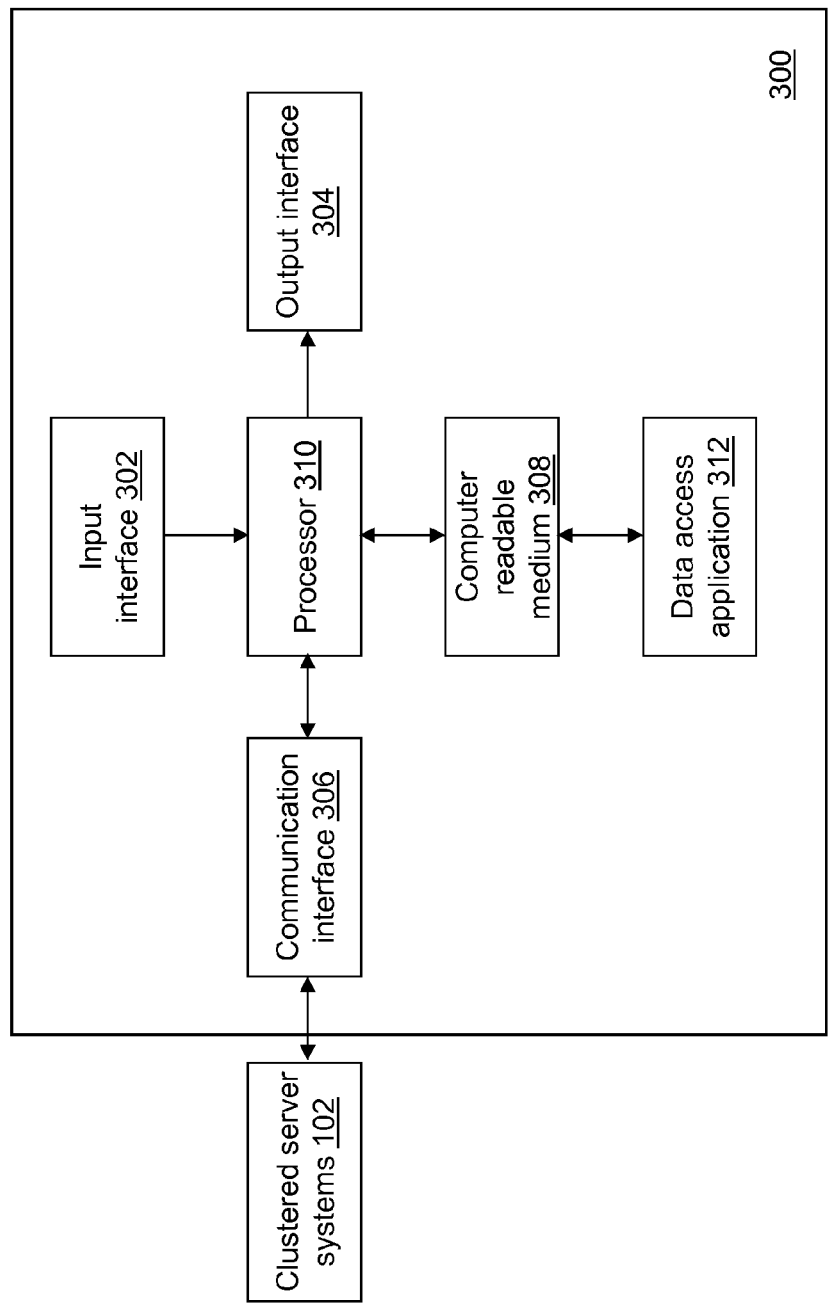
FIG. 3 depicts a block diagram of a data access device of data access systems of the data processing system of FIG. 1 in accordance with an illustrative embodiment.

Referring to FIG. 3, a block diagram of a data access device 300 of the data access systems 104 is shown in accordance with an example embodiment. Data access device 300 is an example computing device of the data access systems 104. Data access device 300 may be embodied by laptop 108, desktop 110, smart phone 112, etc. Data access device 300 may include a second input interface 302, a second output interface 304, a second communication interface 306, a second computer-readable medium 308, a second processor 310, and a data access application 312. Fewer, different, and additional components may be incorporated into data access device 300.

Second input interface 302 provides the same or similar functionality as that described with reference to input interface 202 of node device 200 though referring to data access device 300. Second output interface 304 provides the same or similar functionality as that described with reference to output interface 204 of node device 200 though referring to data access device 300. Second communication interface 306 provides the same or similar functionality as that described with reference to communication interface 206 of node device 200 though referring to data access device 300. Data and messages may be transferred between data access device 300 and the clustered server systems 102 using second communication interface 306. Second computer-readable medium 308 provides the same or similar functionality as that described with reference to computer-readable medium 208 of node device 200 though referring to data access device 300. Second processor 310 provides the same or similar functionality as that described with reference to processor 210 of node device 200 though referring to data access device 300.

Data access application 312 performs operations associated with accessing (i.e., querying, adding to, deleting from, modifying) data 214 stored at each of the clustered server systems 102. For illustration, data access application 312 may provide analysis, visualization, or other processing of data 214 depending on the content of data 214 as understood by a person of skill in the art. Referring to the example embodiment of FIG. 3, data access application 312 is implemented in software (comprised of computer-readable and/or computer-executable instructions) stored in second computer-readable medium 308 and accessible by second processor 310 for execution of the instructions that embody the operations of data access application 312. Data access application 312 may be written using one or more programming languages, assembly languages, scripting languages, etc. Data access application 312 may be implemented as a Web application.

Figure 4:
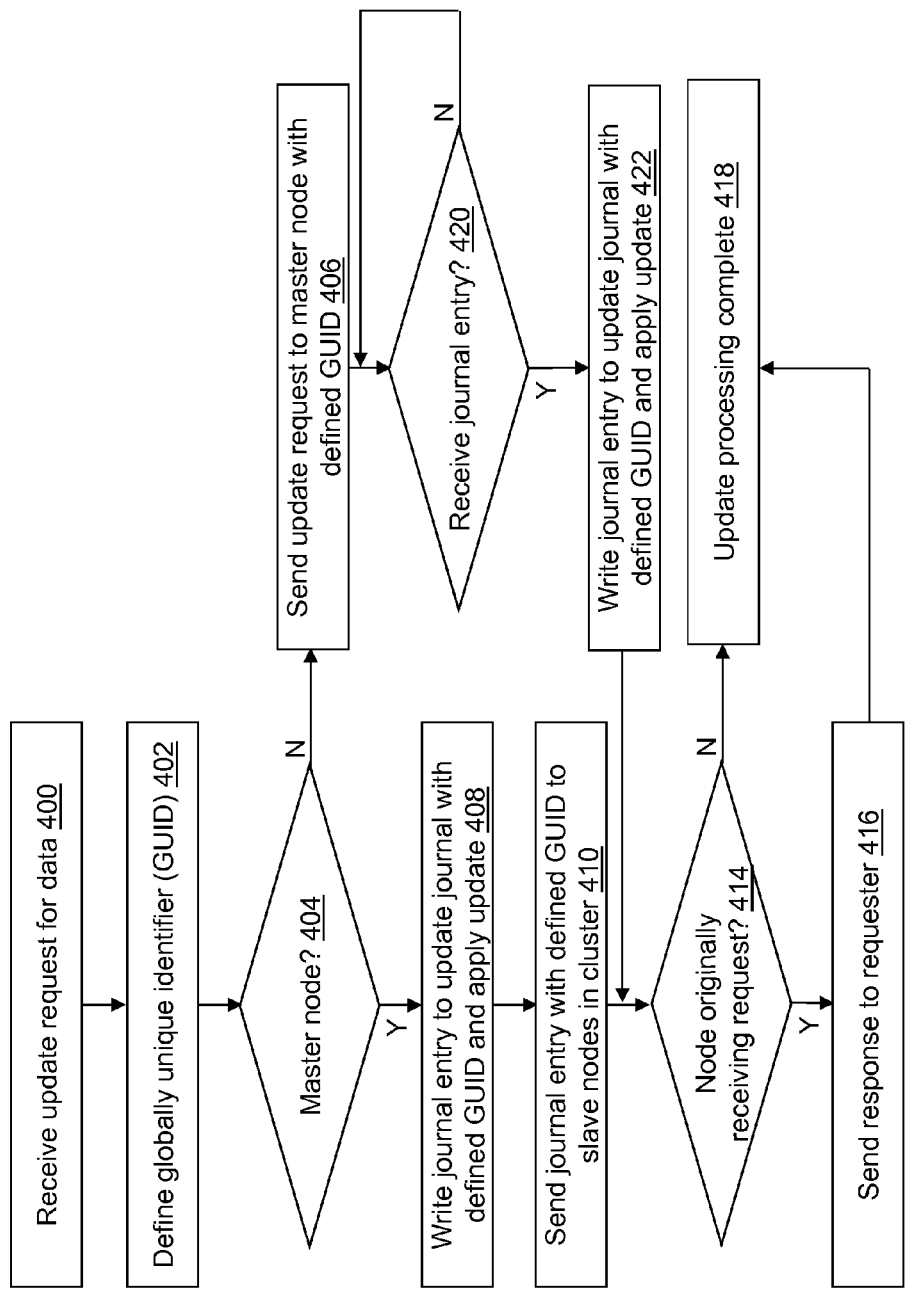
FIG. 4 depicts a flow diagram illustrating examples of operations performed by the node device of FIG. 2 in accordance with an illustrative embodiment.

Referring to FIG. 4, example operations associated with node control application 212 are described. Additional, fewer, or different operations may be performed depending on the embodiment. The order of presentation of the operations of FIG. 4 is not intended to be limiting. Although some of the operational flows are presented in sequence, the various operations may be performed in various repetitions, concurrently (in parallel, for example, using threads), and/or in other orders than those that are illustrated. For example, a user may execute node control application 212, which causes presentation of a first user interface window, which may include a plurality of menus and selectors such as drop down menus, buttons, text boxes, hyperlinks, etc. associated with node control application 212 as understood by a person of skill in the art. The plurality of menus and selectors may be accessed in various orders. An indicator may indicate one or more user selections from a user interface, one or more data entries into a data field of the user interface, one or more data items read from computer-readable medium 208 or otherwise defined with one or more default values, etc. that are received as an input by node control application 212.

As another example, node control application 212 may be configured to respond to multiple and different types of requests from multiple computing devices of the data access systems 104 as well as requests from the master node. When the clustered server systems 102 are initialized, a pool of available threads to run requests from the data access systems 104 may be defined at each node. Configuration settings may define a minimum and a maximum number of threads in each pool. When a request is received from a computing device of the data access systems 104, one of the available threads may be used to process the request. If no threads are available, the node may create a new thread. If the thread pool has reached the maximum size, the request may wait until a thread is returned to the pool. When processing is complete for the update request, the thread may be returned to the pool. If the number of available threads exceeds the minimum thread pool size, unused threads may be destroyed after a period of time to conserve system resources.

When the clustered server systems 102 are started, the nodes establish communication with one another and select the master node, for example, using various algorithms as understood by a person of skill in the art. If the master node fails, another node is promoted to serve as the master node, and the cluster resumes operation. If a slave node fails, the slave node drops out of the clustered server systems 102, an alert may be generated, and load balancing uses only the remaining slave nodes.

A slave node and a master node may locally process and respond to a read request from data 214 stored at each node of the clustered server systems 102. The read request may be received from a computing device of the data access systems 104 and not involve an interaction with another node of the plurality of computing nodes irrespective of whether the node is a master node or a slave node.

In an operation 400, an update request for data 214 is received at one of the plurality of nodes of the clustered server systems 102 from a computing device of the data access systems 104. The update request, such as add data, delete data, or modify data, involves a change to data 214 stored at each node of the clustered server systems 102. The update request may be received from a computing device of the data access systems 104. The update request may include a reference to a stored procedure or function defined based on how data 214 is stored and the type of update requested, e.g., add, delete, modify, as understood by a person of skill in the art.

Figure 5:
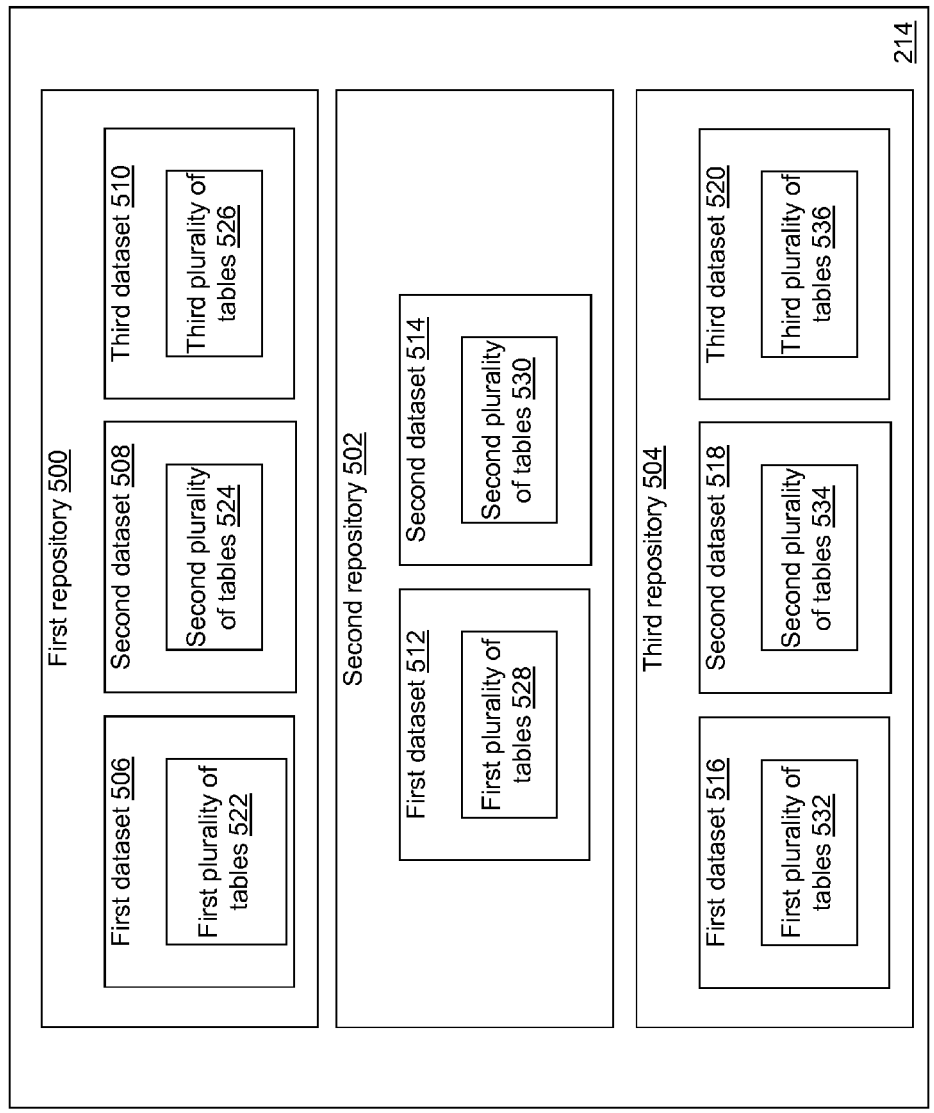
FIG. 5 illustrates data organized as one or more repositories in accordance with an illustrative embodiment.

Data 214 may be organized based on a schema of relational tables. As an example, referring to FIG. 5, data 214 may be organized as one or more repositories, such as a first repository 500, a second repository 502, and a third repository 504. A repository may be described as a physical memory location in which a collection of related data objects is stored. Each repository may include one or more datasets, such as a first dataset 506, a second dataset 508, and a third dataset 510 for first repository 500; a first dataset 512 and a second dataset 514 for second repository 502; and a first dataset 516, a second dataset 518, and a third dataset 520 for third repository 504. Each dataset may include one or more tables, such as a first plurality of tables 522 for first dataset 506 of first repository 500, a second plurality of tables 524 for second dataset 508 of first repository 500, a third plurality of tables 526 for third dataset 510 of first repository 500, a fourth plurality of tables 528 for first dataset 512 of second repository 502, a fifth plurality of tables 530 for second dataset 514 of second repository 502, a sixth plurality of tables 532 for first dataset 516 of third repository 504, a seventh plurality of tables 534 for second dataset 518 of third repository 504, and an eighth plurality of tables 536 for third dataset 520 of third repository 504. Each table may include one or more rows that include one or more data items. Data 214 may include any number of repositories, datasets within each repository, tables within each dataset, rows within each table and data items within each row. A size of data 214 may be greater than a gigabyte and may be configured for access by hundreds of users or more.

When data 214 stores metadata, an individual metadata object may be stored as a row in a table according to a metadata type of the metadata object. A metadata object identifier (ID) (MOID) (i.e., a 17 character string) may be unique among all rows in all tables in all repositories of data 214. The MOID may be stored in an ID column, which may be a primary key of each dataset. When the metadata object is modified, a current date-time value may be updated in a column called definition modification date-time (DEFMODDT). The current date-time value may be used as a unique version number for the metadata object.

The collection of repositories managed by the clustered server systems 102 may be described by a metadata object of type repository base stored in a repository control (Rposctrl) dataset of the datasets. There may be a repository base record to describe each repository in data 214 thereby serving as a table of contents for data 214. The repository base records indicate the presence of the repositories. When a new repository is added to data 214, a record describing it is added to the Rposctrl dataset.

The collection of datasets that constitute each repository may be described by a metadata object of type metadata type (Metatype) stored in a Metatype dataset of the datasets. There may be a Metatype record to describe each dataset in data 214 thereby serving as a table of contents for the repository. The Metatype records indicate the presence of the datasets. When a new dataset is added to the repository, a record describing it is added to the Metatype dataset. When the clustered server systems 102 begins using a repository, the clustered server systems 102 read the Metatype dataset to know what datasets to open for each repository. The relationships between the individual metadata objects may also be a metadata object of type metadata association (mdassoc) stored in an mdassoc dataset of the datasets.

An in-memory (i.e., RAM, cache) data structure may be used to provide access to the datasets. The data structure may include a first chain and a second chain. The first chain may be implemented as a linked list of Rposctrl objects, one for each repository. Each Rposctrl object may include the second chain, which may be implemented as a linked list of dataset persistence (Dsprsist) objects, one for each Metatype record. When each repository is opened, the Metatype dataset is read in, and a Dsprsist object is added to the second chain for that Rposctrl object. The data structure forms a tree structure with the first chain forming a trunk of a tree, and the second chains forming branches.

Each second chain item provides access or provides information facilitating access to the metadata objects of a particular type that are stored in one of the datasets. Each record in a dataset has the MOID identifying the metadata object. The associated DEFMODDT value identifies a unique version of that object. In an example embodiment, only the most recent version of each metadata object is stored, so there is only one row in the dataset with a given MOID value. The MOID may be another object ID (OID) that is uniquely associated with a record in data 214 based on the type of data stored in data 214.

Illustrative metadata may be associated with other data sources and data structures that are accessed by data access applications 312; resources that are created and used by data access applications 312, including information maps, online analytical processing cubes, report definitions, stored process definitions, scheduled jobs, etc.; other servers supporting execution of data access applications 312; information describing users and groups of users that use data access applications 312 and the levels of access that users and groups have to resources; etc.

To enable high-speed access by data access applications 312, the clustered server systems 102 may be implemented as an "in-memory" server. As data access applications 312 submit queries and update requests, the datasets that contain the requested records may be read from the repository datasets stored on disk into the node's memory (i.e., RAM, cache), where the datasets remain until the clustered server systems 102 is paused and resumed or until the clustered server systems 102 is stopped.

Referring again to FIG. 4, in an operation 402, a globally unique identifier (GUID) is defined for the received update request as understood by a person of skill in the art.

In an operation 404, a determination is made concerning whether or not the node is designated as the master node. If the node is not designated as the master node, processing continues in an operation 406. If the node is designated as the master node, processing continues in an operation 408.

In an illustrative embodiment, the master node may serialize multiple received update requests and perform constraint checks on the received update requests. In operation 408, each update request is written to update journal 216 as a journal entry in association with the defined GUID, and the update is applied. The DEFMODDT value is associated with the update request. The update request may include update request transaction information based on the type of update request. Update journal 216 may be reinitialized after a backup of data 214.

For illustration, the master node forms the update transaction into an in-memory (i.e., RAM, cache) data structure that may be termed a workunit that captures a series of add record, update record, or delete record operations based on the update request. The update request may be applied to both in-memory and disk versions of data 214. For example, when the update transaction is complete for the in-memory version of data 214, the transaction is stored to a disk version of data 214 though potentially later in time. As each record image is created and committed to memory, a snapshot of that record image may be added to a contiguous array of record images in-memory (i.e., RAM, cache) that may be termed the journal entry. When the master node completes the add, update, and/or delete operations on data 214, the journal entry may be complete. The journal entry may be written as a single large record to update journal 216.

In an operation 410, the update request is sent from the master node to each slave node of the clustered server systems 102. For illustration, the update request may be broadcast to each slave node. The journal entry may be transmitted as a single block to each of the slave nodes of the clustered server systems 102.

In an operation 414, a determination is made concerning whether or not the node originally received the update request from the computing device of the data access systems 104. For example, the node may recognize that the update request was received through a connection to the computing device of the data access systems 104 with which the node is communicating. If the node originally received the update request from the computing device of the data access systems 104, processing continues in an operation 416. If the node did not originally receive the update request from the computing device of the data access systems 104, processing continues in an operation 418.

In operation 416, the node sends a response to the requesting computing device of the data access systems 104 that indicates completion of the update of data 214, and processing continues in operation 418. For example, the response may include the MOID of any new objects added and/or a list of the MOID of objects deleted by the requested update. In an illustrative embodiment, synchronization testing (for example, described with reference to FIGS. 6 and 7a-7c) may be performed with each update request. The response may include information related to the synchronization test such as whether or not the nodes are synchronized and for which dataset(s).

In operation 418, processing of the update request is complete. Access to data 214 may be returned to the data access systems 104 as soon as processing of the update request is complete. For example, updates of data 214 may be stopped while the update is processed. If a node fails before the update process has applied the update from update journal 216, the node may be configured to automatically recover the update from update journal 216 when the node is restarted based on a last journal entry processed. If the last journal entry processed is not included in update journal 216, for example, because the last journal entry processed occurred before a last backup, the node first may recover from the last backup and next recover using update journal 216. Use of the update request provides a message construct by which a request to check synchronization does not use a separate request message. By "hiding" the synchronization check in the normal journal entry processing, the synchronization checking can be made very efficient. Additionally, the synchronization check is part of the normal event stream of the cluster and does not interfere with the multi-threaded concurrent operation of the live cluster.

In operation 406, the update request is sent to the master node with the defined GUID so that master node can write the update request to the master node's update journal 216 before the update is applied at any of the slave nodes.

In an operation 420, a determination is made concerning whether or not the journal entry is received from the master node. If the journal entry is not received from the master node, processing continues in operation 420 to await receipt of the journal entry. If the journal entry is received from the master node, processing continues in an operation 422.

Similar to operation 408, in operation 422, each update request is written to update journal 216 as a journal entry in association with the defined GUID, and the update is applied. The DEFMODDT value defined by the master node is maintained by the slave node. The node that originally received the update request applies the update request and responds to the computing device of the data access systems 104 when it receives the update request back from the master node in operation 416. Processing continues at operation 414 to make this determination.

Any number of different users may be interacting with data 214 through any node device 200 of the clustered server systems 102 at any given time. Thus, node control application 212 executing at each node device 200 of the clustered server systems 102 is continuously performing operations 400 to 422 at various points in various repetitions as various users access data 214. The operations executed depend on whether the node is a slave node or the master node.

Figure 6:
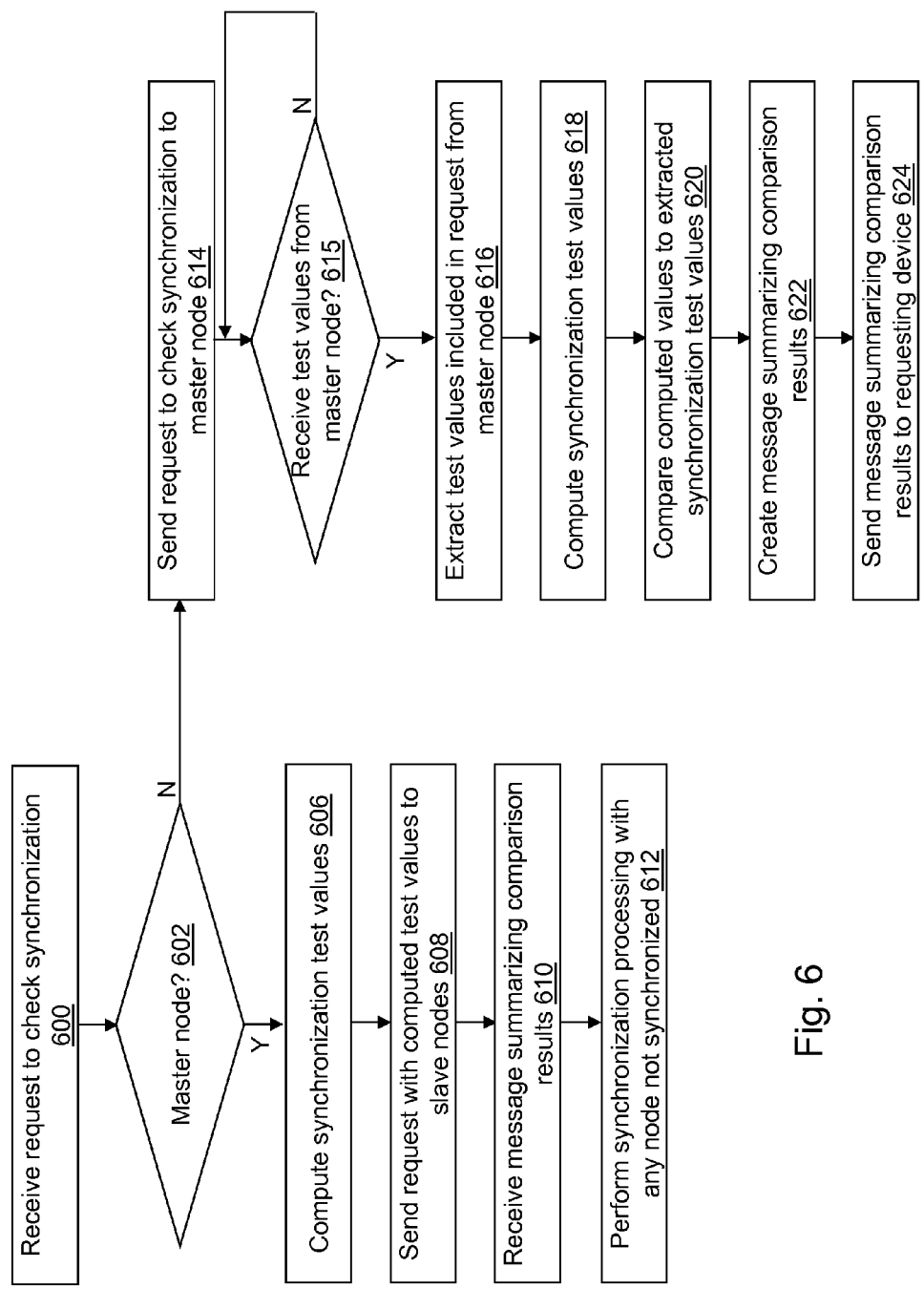
FIG. 6 depicts a flow diagram illustrating additional examples of operations performed by the node device of FIG. 2 in accordance with an illustrative embodiment.

Referring to FIG. 6, additional example operations associated with node control application 212 are described. The order of presentation of the operations of FIG. 6 is not intended to be limiting, and additional, fewer, or different operations may be performed depending on the embodiment.

In an operation 600, a request to check synchronization between the content of data 214 stored at each node device 200 of the clustered server systems 102 is received from a requesting device. For example, a timer may periodically and automatically generate the request that is received. As another example, a computing device of data access systems 104 may be the requesting device that sends the request. As still another example, the request may be received as part of an update or query request from a computing device of data access systems 104. For example, the request may be received as part of an update request in which case, the operations of FIGS. 6 and 7a-7c may be performed after operations 410 and 422 described with reference to FIG. 4.

The request may include one or more parameters indicating that the synchronization is for all of the repositories of data 214, a specific repository or list of repositories, all of the datasets, a specific dataset or a list of specific datasets, all of the tables, a specific table or a list of specific tables, from a start date, to a stop date, from a start time, to a stop time, from a start date-time, to a stop date-time, etc. The request may include one or more repository, dataset, or table names, a start date value, a stop date value, a start time value, a stop time value, a start date-time value, a stop date-time value, etc. that may be determined automatically or by a user of node control application 212 or of data access application 312.

In one example, the request might be generated as part of a nightly backup run on the master node such that the requesting device is the master node. The request to check synchronization may be triggered to occur right after the backup is completed and may coincide with a time of low cluster activity so that the synchronization test occurs when it has the least impact on users. As another example, the request might be manually triggered from an administrator control console if inconsistent results are suspected, or as a regular part of maintenance tasks. As another example, the request may be generated when any node device 200 of the clustered server systems 102 has been disrupted by an equipment or power failure to ensure that the update of the node properly synchronized to the remaining nodes of the clustered server systems 102.

In an operation 602, a determination is made concerning whether or not the node is designated as the master node. If the node is not designated as the master node, processing continues in an operation 614. If the node is designated as the master node, processing continues in an operation 606.

Figure 7A:
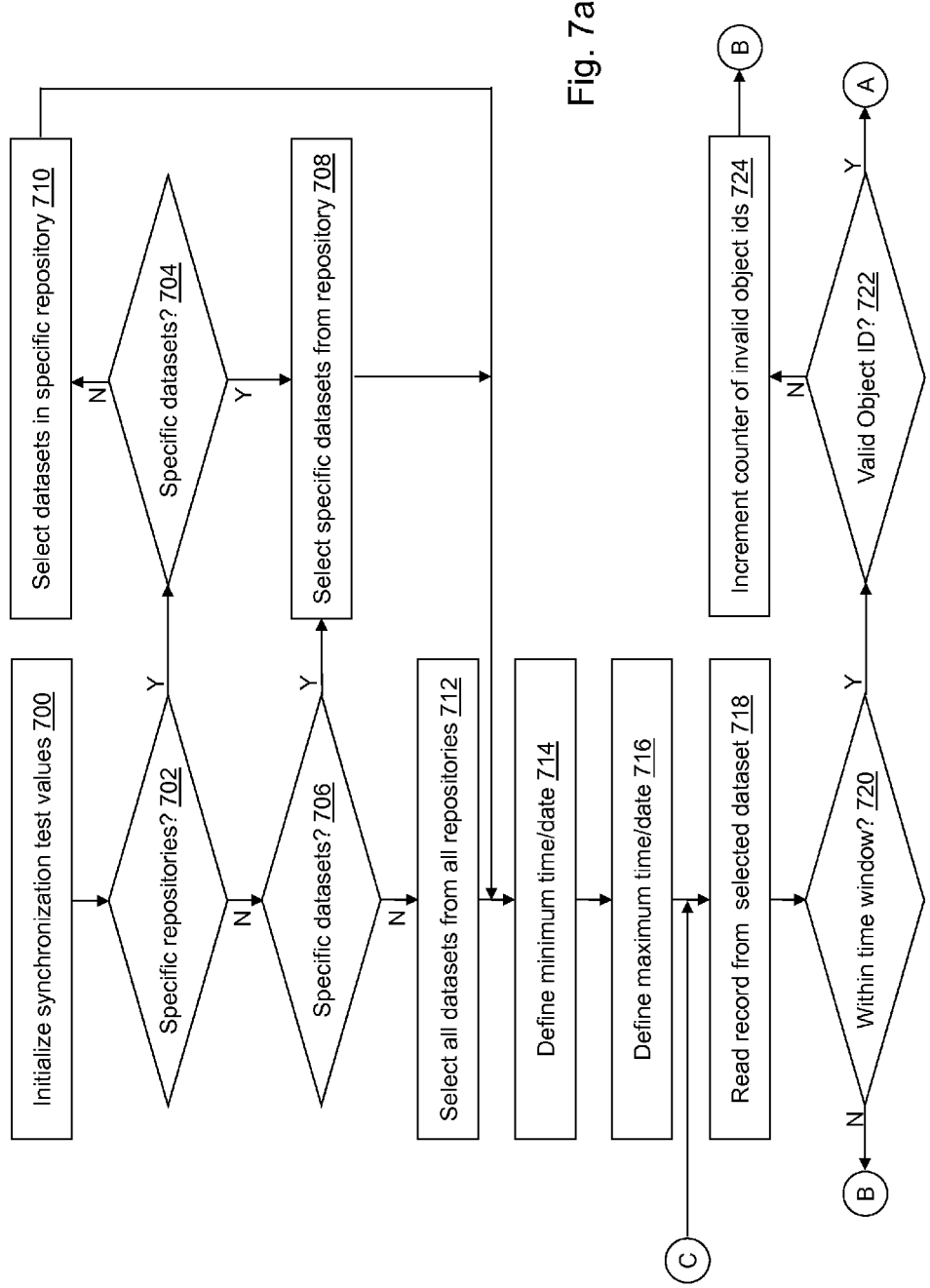
Figure 7C:
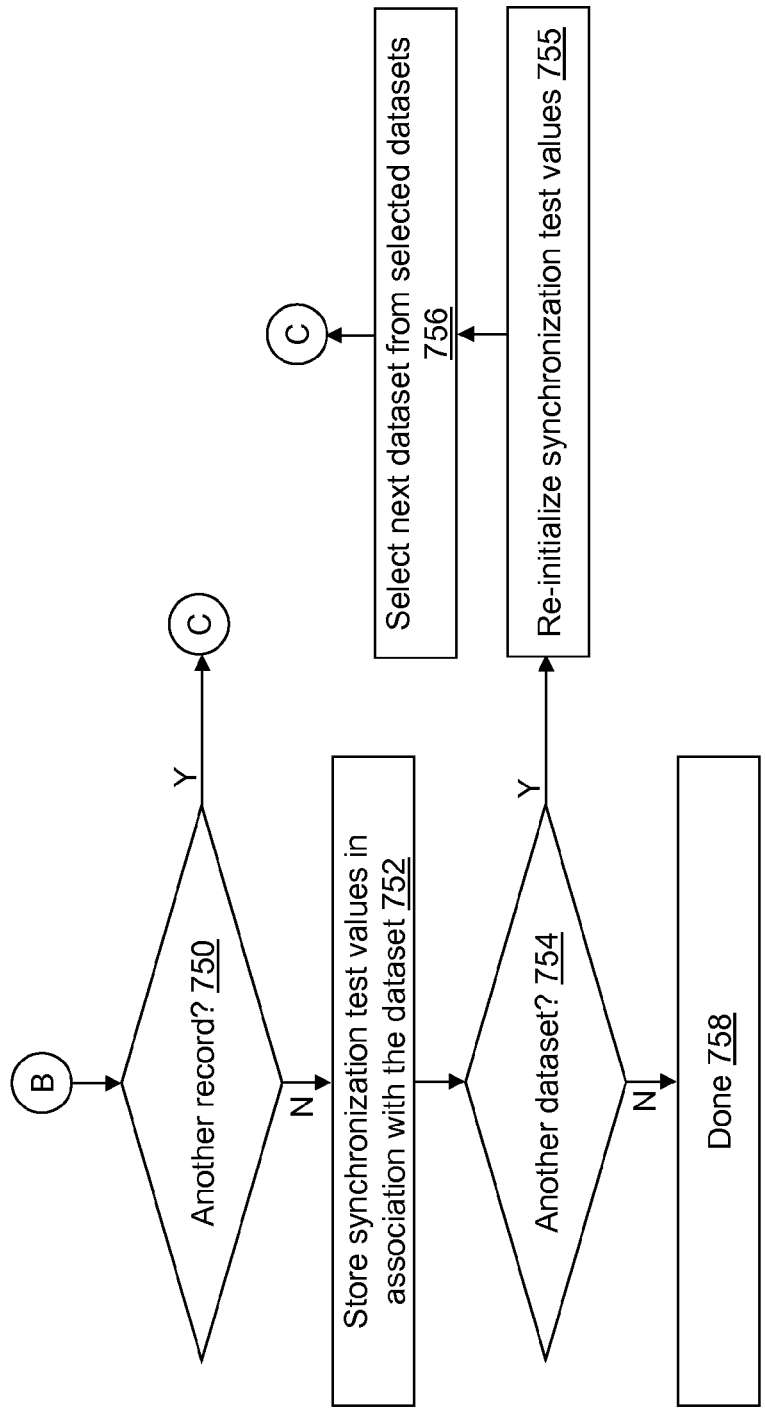

In operation 606, synchronization test values are computed. Referring to FIGS. 7a-7c, example operations associated with computing the synchronization test values are described. The order of presentation of the operations of FIGS. 7a-7c is not intended to be limiting, and additional, fewer, or different operations may be performed depending on the embodiment.

Synchronization test values may be computed for each dataset and may include one or more of a number of records in the dataset, a number of records with an invalid OID in the dataset, a lowest OID in the dataset, a highest OID in the dataset, a lowest DEFMODDT value in the dataset, a highest DEFMODDT value in the dataset, and a sum of the DEF- MODDT values in the dataset. The test values may be computed for each repository, for each table, etc. depending on the organization of data 214.

In an operation 700, the synchronization test values are initialized. For example, the sum of the DEFMODDT values for each dataset for which the synchronization test values are to be computed may be initialized to zero, the lowest OID and the lowest DEFMODDT value may be initialized to a large value, the highest OID and the highest DEFMODDT value may be initialized to a small or negative value, the number of records with an invalid OID may be initialized to zero, etc. as understood by a person of skill in the art.

In an operation 702, a determination is made concerning whether or not the synchronization request indicated a specific repository or specific repositories to check. If the synchronization request indicated a specific repository or specific repositories, processing continues in an operation 704. If the synchronization request did not indicate a specific repository or specific repositories, processing continues in an operation 706.

In operation 704, a determination is made concerning whether or not the synchronization request indicated a specific dataset or specific datasets to check. For example, the request to check synchronization may include a name of the specific dataset or a list of names of datasets included in the specific repository or specific repositories. If the synchronization request indicated a specific dataset or specific datasets, processing continues in an operation 708. If the synchronization request did not indicate a specific dataset or specific datasets, processing continues in an operation 710.

In operation 706, a determination is made concerning whether or not the synchronization request indicated a specific dataset or specific datasets to check. For example, the request to check synchronization may include a name of the specific dataset or a list of names of datasets. If the synchronization request indicated a specific dataset or specific datasets, processing continues in operation 708. If the synchronization request did not indicate a specific dataset or specific datasets, processing continues in an operation 712.

In operation 708, the specific dataset or specific datasets indicated in the synchronization request is/are selected as the dataset(s) to check. A first dataset is selected as the specific dataset or is selected from the specific datasets.

In operation 710, the datasets included in the specific repository or specific repositories indicated in the synchronization request are selected as the datasets to check. A first dataset is selected from the datasets included in the specific repository or specific repositories.

In operation 712, all of the datasets included in data 214 are selected as the datasets to check. A first dataset is selected from the selected datasets.

In an operation 714, a minimum date-time is defined based on a start date, a start time, or a start date-time indicated in the synchronization request. If no start date, start time, or start date-time is indicated in the synchronization request, a default date-time may be defined for the minimum date-time by default or may be defined by a user. If a start date is indicated in the synchronization request, the minimum date-time may be defined as 0:0:0 for the start date indicated. If a start date-time is indicated in the synchronization request, the minimum date-time may be defined as the value of the start date-time indicated. If a start time is indicated in the synchronization request, the minimum date-time may be defined as the value of the start time indicated on a current date. A default value for the minimum date-time may be defined as the date-time of the last synchronization operation.

In an operation 716, a maximum date-time is defined based on a stop date a stop time, or a stop date-time indicated in the synchronization request. If no stop date, stop time, or stop date-time is indicated in the synchronization request, a default time may be defined for the maximum date-time by default or may be defined by a user. If a stop date is indicated in the synchronization request, the maximum date-time may be defined as 23:59:59 for the stop date indicated. If a stop date-time is indicated in the synchronization request, the maximum date-time may be defined as the value of the stop date-time indicated. If a stop time is indicated in the synchronization request, the maximum date-time may be defined as the value of the stop time indicated on the current date. A default value for the maximum date-time may be defined as a current date-time.

In an operation 718, a record is read from the selected first dataset. In an operation 720, a determination is made concerning whether or not the DEFMODDT value for the read record is within the time window defined by the minimum date-time and the maximum date-time. If the DEFMODDT value for the read record is within the time window, processing continues in an operation 722. If the DEFMODDT value for the read record is not within the time window, processing continues in an operation 750.

In operation 722, a determination is made concerning whether or not the OID for the read record is valid. For example, the OID may be determined as invalid based on a repository ID portion of the OID being incorrect. For example, a failure of a file system, or an outside program may inadvertently move a dataset from a foreign repository library into the library for this repository, or some other process may have appended records to a dataset resulting in an invalid OID. If the OID for the read record is valid, processing continues in an operation 730. If the OID for the read record is not valid, processing continues in an operation 724.

In operation 724, a number of records with an invalid OID is incremented for the selected first dataset, and processing continues in operation 750.

In operation 730, the number of records in the dataset is incremented for the selected first dataset. In an operation 732, the DEFMODDT value of the read record is added to the sum of the values of the DEFMODDT for the selected first dataset.

In an operation 734, a determination is made concerning whether or not the OID for the read record is lower than the lowest OID for the selected first dataset. If the OID for the read record is lower than the lowest OID, processing continues in an operation 736. If the OID for the read record is not lower than the lowest OID, processing continues in an operation 738. In operation 736, the lowest OID for the selected first dataset is set to the OID for the read record, and processing continues in operation 738.

In operation 738, a determination is made concerning whether or not the OID for the read record is higher than the highest OID for the selected first dataset. If the OID for the read record is higher than the highest OID, processing continues in an operation 740. If the OID for the read record is not higher than the highest OID, processing continues in an operation 742. In operation 740, the highest OID for the selected first dataset is set to the OID for the read record, and processing continues in operation 742.

In an operation 742, a determination is made concerning whether or not the DEFMODDT value for the read record is lower than the lowest DEFMODDT value for the selected first dataset. If the DEFMODDT value for the read record is lower than the lowest DEFMODDT value, processing continues in an operation 744. If the DEFMODDT value for the read record is not lower than the lowest DEFMODDT value, processing continues in an operation 746. In operation 744, the lowest DEFMODDT value for the selected first dataset is set to the DEFMODDT value for the read record, and processing continues in operation 746.

In operation 746, a determination is made concerning whether or not the DEFMODDT value for the read record is higher than the highest DEFMODDT value for the selected first dataset. If the DEFMODDT value for the read record is higher than the highest DEFMODDT value, processing continues in an operation 748. If the DEFMODDT value for the read record is not higher than the highest DEFMODDT value, processing continues in operation 750. In operation 748, the highest DEFMODDT value for the selected first dataset is set to the DEFMODDT value for the read record, and processing continues in operation 750.

In operation 750, a determination is made concerning whether or not the selected first dataset includes another record. If the selected first dataset includes another record, processing continues in operation 718 to read another record. If the selected first dataset does not include another record, processing continues in an operation 752.

In operation 752, the computed synchronization test values are stored in association with an identifier of the selected first dataset. For example, the identifier may be a dataset name.

In an operation 754, a determination is made concerning whether or not the selected datasets includes another dataset. If the selected datasets includes another dataset, processing continues in an operation 755. If the selected datasets do not include another dataset, processing continues in an operation 758.

Similar to operation 700, in operation 755, the synchronization test values are initialized. In an operation 756, a next dataset is selected from the selected datasets and processing continues in operation 718 to process the next dataset as the selected dataset.

In operation 758, the computation of the synchronization test values is done.

Referring again to FIG. 6, in an operation 608, a request to check synchronization is sent to each slave node. The request includes one or more of the computed synchronization test values as well as any other parameters included in the request received in operation 600. For example, the request may include a string prefaced with an indicator that the values are from the master node (i.e., "master=") that includes each of the computed synchronization test values separate by commas (or any other delimiter).

In an illustrative embodiment, the master node may further add the string to a column of the row in the Metatype dataset associated with the dataset and update the record of that metatype object as with any other update request and as described with reference to FIG. 4. A copy of that record may be placed in the workunit for the update request transaction, and may be transmitted to each slave node as described with reference to FIG. 4 so that each slave node has a concise summarization of the contents of that dataset automatically with each update request and journal entry received.

In an operation 610, a message is received from each slave node that includes a summary of the comparison results. For example, if the comparison between the synchronization test values computed by the master node and those computed by the slave node indicates synchronization (the values match), the message may indicate that the status is synchronized; whereas, if the comparison between the synchronization test values computed by the master node and those computed by the slave node indicates the nodes are not synchronized (any value of the values does not match), the message may indicate an error in synchronization. The message may further indicate a repository, a dataset name, a table name, etc. associated with the error. The message may indicate the comparison results for each repository and/or dataset selected and evaluated in FIGS. 7a-7c.

In an illustrative embodiment, an administrator application may initiate the synchronization process and request the results from each slave node such that each slave node holds their results until asked to provide them to the administrator application that may or may not be executing at the master node.

In an operation 612, synchronization processing may be performed with any slave node for which an error in synchronization was indicated in the received message. For example, a request for a more detailed report may be sent to the slave node for which an error in synchronization was indicated. Using the more detailed report, the slave node may be synchronized using update journal 216 and/or a backup file. For example, data on the slave node may be replaced either in part or entirely. The slave may recover from the last backup created by the master node by processing all the journal entries in the update journal or may recover based on a de-synchronization time or a dataset identifier that identifies a specific dataset that is not in synchronization and identified in the more detailed report. The detailed results returned by the slave provide information that makes this possible. A message summarizing the synchronization results may be sent to the requesting computing device of data access systems 104 if the request was received from a computing device of data access systems 104.

In operation 614, the request to check synchronization is forwarded to the master node so that the master node can coordinate the synchronization check so that master node can compute the synchronization test values.

In an operation 615, a determination is made concerning whether or not the synchronization test values have been received from the master node. If the synchronization test values have not been received from the master node, processing continues in operation 615 to await receipt of the synchronization test values. If the synchronization test values have been received from the master node, processing continues in an operation 616.

In operation 616, the master node's synchronization test values are extracted from the request sent in operation 608 and received from the master node in operation 615.

Similar to operation 606, in an operation 618 synchronization test values are computed. In an operation 620, the computed synchronization test values are compared to the extracted master node's synchronization test values.

In an operation 622, a message is created that summarizes the results of the comparison. For example, if the computed synchronization test values match the extracted master node's synchronization test values for data 214, for a specific repository, for a specific dataset, etc. based on the parameters included in the request, the message may indicate that the slave node and the master node are synchronized. If the computed synchronization test values do not match the extracted master node's synchronization test values for data 214, for a specific repository, for a specific dataset, etc., the message may indicate that the slave node and the master node are not synchronized for data 214, for the specific repository, for the specific dataset, etc. based on the parameters included in the request.

In an operation 624, the created message is sent to the requesting device that sent the request received in operation 600.

The described synchronization checking provides a mechanism that can be run by node control application 212 executing at the master and slave nodes during normal operation and can check whether or not all records in all journal entries have been added/updated/deleted equally on the slave and the master. The clustered server systems 102 remain in operation, and the computations can be performed rapidly and for specific datasets and time windows to further reduce the computation time.

As described above, the clustered server systems 102 can perform a full check synchronization operation, Synch-Check, or incremental check synchronization operation. If the master node keeps in memory the metatype objects that it produced during the last SynchCheck, the master node can regularly compute an incremental check by selecting only objects whose modification date-time stamp is greater than the date-time of the last check synchronization operation. It is essentially a difference between the last time a check synchronization operation was performed and the present time. It does not matter if there is an overlap in time between one SynchCheck and the next as long as the master node and the slave node use the same starting and ending times because each samples the same objects to generate the same results. If the master node includes a string that describes the time interval in each of the metatype descriptions (e.g., after the master=string), the slave node can use the same start and end times and select exactly the same set of records as the master node selected. For illustration, the sample period string may have the form: sample=01Jan1960:00:00:00, 08Jul2014:04:52:17

Since the sample string may be included as part of each metatype record and based on the ending time of the last sample for that specific dataset, the incremental nature of the SynchCheck can be customized for different repositories and metadata types. That is, not all repositories have to be SynchChecked in each operation. So, each metatype record's description can then be saved to the metatype disk dataset as proof of the integrity of that described dataset and may indicate when the dataset was last checked.

Additional information that can be added to the description is the status of the last check which can be either Status="OK" or Status="ERROR", for example.

After a SynchCheck operation, either the master node, or another utility can perform a status operation on each slave for a summarization of it's latest SynchCheck results. An example status query may have the form:

```
<SynchCheck>
    <Results/>
</SynchCheck>
```

The slave node may reply by including the details of which repositories were checked. If there were no errors, all that may be listed for each repository is the repository ID and name as shown in the example below:

```
<SynchCheck>
    <Results>
        <Repository Id="A0000001" Name="REPOSMGR"/>
        <Repository Id="A5J9B34B" Name="Foundation"/>
    </Results>
</SynchCheck>
```

If any metadata type in a repository had any miscompares, those errors may be noted as shown below:

```
<SynchCheck>
    <Results>
        <Repository Id="A0000001" Name="REPOSMGR"/>
        <Repository Id="A5DST1OY" Name="Foundation">
            <Container Name="testroot" Status="ERROR"/>
        </Repository>
        <Repository Id="A5GX7932" Name="scratch2"/>
    </Results>
</SynchCheck>
```

Once the errors are detected, a more detailed report can be requested that may include sample signature information such as:

```
<Container
    Master="1,0,AS000001,AS000001,01Jan1960:00:00:00,01Jan1960:00:
        00:00,1708466646.69,"
    Name="testroot"
    Sample="19Feb2014:21:51:30,19Feb2014:22:04:34"
    Slave="0,0,,,01Jan1960:00:00:00,01Jan1960:00:00:00,0,"
Status="ERROR"/>
```

Using the provided sample period, a more specific incremental check can be directed at a specific dataset for a small time increment to identify which OIDs are involved. Further refinement of that information could also be used to create a query of the specific object that is out of synchronization followed by an update of that object.

A data access device 300 may invoke the check synchronization operation through a "Refresh" method in the manner shown below for illustration to invoke an incremental SynchCheck:

```
<Refresh>
    <Options>
        <SynchCheck/>
    </Options>
</Refresh>
```

To invoke a full SynchCheck, the following can be used:

```
<Refresh>
    <Options>
        <SynchCheck SampleStart="01Jan1960:00:00:00"/>
    </Options>
</Refresh>
```

The Refresh can be sent to any node of the clustered server systems 102. If sent to a slave node, the slave node automatically forwards the request to the master node for processing as described with reference to FIG. 6.

To query the results of the latest SynchCheck on a slave node, the following Status request can be sent to that slave node:

```
<Status>
    <Metadata>
        <SynchCheck>
            <Results/>
        </SynchCheck>
        <OMA JOURNALENTRYNUMBER=""/>
        <OMA JOURNALENTRYGUID=""/>
    </Metadata>
</Status>
```

To limit the results to a particular repository, the following can be sent:

```
<Refresh>
    <Options>
        <SynchCheck ReposName="Foundation/>
    </Options>
</Refresh>
```

1. A method that operates on live servers in the normal stream of updates transmitted from master node to slave nodes. It requires only very minor change in server API. Does not interrupt client transactions.
2. A method that requires only very small amounts of additional data to be transmitted between servers (<1 MB will ensure consistency of >1 GB of data).
3. A method that provides very rapid computation (e.g., 10 seconds versus 4 minutes for full database check).
4. A method that permits complete comparison or incremental comparisons using variable time window.

Since there is a Metatype record for every dataset in each repository, and since the details in those Metatype records are not otherwise used, they are the perfect vehicles between the master node and the slaves to carry a concise representation of the contents of the whole dataset. Also, since the critical factor regarding any record in a dataset is its Object ID and its Modification datetime, a concise summarization of any dataset can be formed by these few items:
1. The number of records in the dataset.
2. The number of records whose Object ID is invalid because it has the wrong repository ID (the first 8 characters).
3. The lowest Object ID.
4. The highest Object ID.
5. The lowest modification datetime.
6. The highest modification datetime.
7. A simple sum of all of the modification datetime values.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
receive a request to check synchronization between slave data stored at a slave node and master data stored at a master node from a requesting device, wherein the request is an update request that indicates an update to a record of a dataset, wherein the request includes master synchronization test values computed by the master node, wherein the master synchronization test values include a number of records included in the dataset of the master data and a sum of modification time values for the records included in the dataset of the master data, wherein each modification time value of the modification time values for the records included in the dataset of the master data indicates a time that a respective record of the records included in the dataset of the master data was last modified;
compute slave synchronization test values in response to receipt of the request, wherein the slave synchronization test values include a number of records included in the dataset of the slave data and a sum of modification time values for the records in the dataset of the slave data, wherein each modification time value of the modification time values for the records in the dataset of the slave data indicates a time that a respective record of the records included in the dataset of the slave data was last modified;
compare the computed slave synchronization test values to the received master synchronization test values; and
send a message to the requesting device that indicates that the slave node is synchronized with the master node when the computed slave synchronization test values match the received master synchronization test values, or that indicates that the slave node is not synchronized with the master node when the computed slave synchronization test values do not match the received master synchronization test values.

2. The non-transitory computer-readable medium of claim 1, wherein the received master synchronization test values include a lowest object identifier computed from the records in the dataset of the master data, and wherein the computed slave synchronization test values further include a lowest object identifier computed from the records in the dataset of the slave data.

3. The non-transitory computer-readable medium of claim 2, wherein the received master synchronization test values include a highest object identifier computed from the records in the dataset of the master data, and wherein the computed slave synchronization test values further include a highest object identifier computed from the records in the dataset of the slave data.

4. The non-transitory computer-readable medium of claim 1, wherein the received master synchronization test values include a lowest modification time value computed from the modification time values for the records in the dataset of the master data, and wherein the computed slave synchronization test values further include a lowest modification time value computed from the modification time values for the records in the dataset of the slave data.

5. The non-transitory computer-readable medium of claim 4, wherein the received master synchronization test values include a highest modification time value computed from the modification time values for the records in the dataset of the master data, and wherein the computed slave synchronization test values further include a highest modification time value computed from the modification time values for the records in the dataset of the slave data.

6. The non-transitory computer-readable medium of claim 1, wherein the received request further includes a minimum time, wherein the modification time value of each respective record of the records included in the dataset of the master data and used to compute the master synchronization test values is greater than or equal to the minimum time, and wherein the modification time value of each respective record of the records included in the dataset of the slave data and used to compute the slave synchronization test values is greater than or equal to the minimum time.

7. The non-transitory computer-readable medium of claim 1, wherein the received request further includes a maximum time, wherein the modification time value of each respective record of the records included in the dataset of the master data and used to compute the master synchronization test values is less than or equal to the maximum time, and wherein the modification time value of each respective record of the records included in the dataset of the slave data and used to compute the slave synchronization test values is less than or equal to the maximum time.

8. The non-transitory computer-readable medium of claim 1, wherein the received request further includes a specific dataset name associated with the dataset of the master data, wherein the dataset of the slave data has the specific dataset name.

9. The non-transitory computer-readable medium of claim 1, wherein the requesting device is the master node.

10. The non-transitory computer-readable medium of claim 1, wherein the update request indicates to add, to delete, or to modify the record of the dataset.

11. The non-transitory computer-readable medium of claim 1, wherein the request is automatically and periodically generated.

12. The non-transitory computer-readable medium of claim 1, wherein the time that the respective record of the records included in the dataset of the master data was last modified includes a date value and a time value.

13. The non-transitory computer-readable medium of claim 1, wherein the computer-readable instructions further cause the computing device to synchronize the slave node with the master node when the computed slave synchronization test values do not match the received master synchronization test values.

14. A computing device comprising:
a processor; and
a non-transitory computer-readable medium operably coupled to the processor, the computer-readable medium having computer-readable instructions stored thereon that, when executed by the processor, cause the computing device to
receive a request to check synchronization between slave data stored at a slave node and master data stored at a master node from a requesting device, wherein the request is an update request that indicates an update to a record of a dataset, wherein the request includes master synchronization test values computed by the master node, wherein the master synchronization test values include a number of records included in the dataset of the master data and a sum of modification time values for the records included in the dataset of the master data, wherein each modification time value of the modification time values for the records included in the dataset of the master data indicates a time that a respective record of the records included in the dataset of the master data was last modified;
compute slave synchronization test values in response to receipt of the request, wherein the slave synchronization test values include a number of records included in the dataset of the slave data and a sum of modification time values for the records in the dataset of the slave data, wherein each modification time value of the modification time values for the records in the dataset of the slave data indicates a time that a respective record of the records included in the dataset of the slave data was last modified;
compare the computed slave synchronization test values to the received master synchronization test values; and
send a message to the requesting device that indicates that the slave node is synchronized with the master node when the computed slave synchronization test values match the received master synchronization test values, or that indicates that the slave node is not synchronized with the master node when the computed slave synchronization test values do not match the received master synchronization test values.

15. The computing device of claim 14, wherein the received master synchronization test values include a lowest object identifier computed from the records in the dataset of the master data, and wherein the computed slave synchronization test values further include a lowest object identifier computed from the records in the dataset of the slave data.

16. The computing device of claim 15, wherein the received master synchronization test values include a highest object identifier computed from the records in the dataset of the master data, and wherein the computed slave synchronization test values further include a highest object identifier computed from the records in the dataset of the slave data.

17. The computing device of claim 14, wherein the received master synchronization test values include a lowest modification time value computed from the modification time values for the records in the dataset of the master data, and wherein the computed slave synchronization test values further include a lowest modification time value computed from the modification time values for the records in the dataset of the slave data.

18. The computing device of claim 17, wherein the received master synchronization test values include a highest modification time value computed from the modification time values for the records in the dataset of the master data, and wherein the computed slave synchronization test values further include a highest modification time value computed from the modification time values for the records in the dataset of the slave data.

19. The computing device of claim 14, wherein the received request further includes a minimum time, wherein the modification time value of each respective record of the records included in the dataset of the master data and used to compute the master synchronization test values is greater than or equal to the minimum time, and wherein the modification time value of each respective record of the records included in the dataset of the slave data and used to compute the slave synchronization test values is greater than or equal to the minimum time.

20. The computing device of claim 14, wherein the received request further includes a maximum time, wherein the modification time value of each respective record of the records included in the dataset of the master data and used to compute the master synchronization test values is less than or equal to the maximum time, and wherein the modification time value of each respective record of the records included in the dataset of the slave data and used to compute the slave synchronization test values is less than or equal to the maximum time.

21. The computing device of claim 14, wherein the update request indicates to add, to delete, or to modify the record of the dataset.

22. The computing device of claim 14, wherein the request is automatically and periodically generated.

23. A method of synchronization testing of a plurality of active clustered servers, the method comprising:
    receiving a request to check synchronization between slave data stored at a slave node and master data stored at a master node from a requesting device by a computing device, wherein the request is an update request that indicates an update to a record of a dataset, wherein the request includes master synchronization test values computed by the master node, wherein the master synchronization test values include a number of records included in the dataset of the master data and a sum of modification time values for the records included in the dataset of the master data, wherein each modification time value of the modification time values for the records included in the dataset of the master data indicates a time that a respective record of the records included in the dataset of the master data was last modified;
    computing, by the computing device, slave synchronization test values in response to receipt of the request, wherein the slave synchronization test values include a number of records included in the dataset of the slave data and a sum of modification time values for the records in the dataset of the slave data, wherein each modification time value of the modification time values for the records in the dataset of the slave data indicates a time that a respective record of the records included in the dataset of the slave data was last modified;
    comparing, by the computing device, the computed slave synchronization test values to the received master synchronization test values; and
    sending, by the computing device, a message to the requesting device that indicates that the slave node is synchronized with the master node when the computed slave synchronization test values match the received master synchronization test values, or that indicates that the slave node is not synchronized with the master node when the computed slave synchronization test values do not match the received master synchronization test values.

24. The method of claim 23, wherein the received master synchronization test values include a lowest object identifier computed from the records in the dataset of the master data, and wherein the computed slave synchronization test values further include a lowest object identifier computed from the records in the dataset of the slave data.

25. The method of claim 24, wherein the received master synchronization test values include a highest object identifier computed from the records in the dataset of the master data, and wherein the computed slave synchronization test values further include a highest object identifier computed from the records in the dataset of the slave data.

26. The method of claim 23, wherein the received master synchronization test values include a lowest modification time value computed from the modification time values for the records in the dataset of the master data, and wherein the computed slave synchronization test values further include a lowest modification time value computed from the modification time values for the records in the dataset of the slave data.

27. The method of claim 26, wherein the received master synchronization test values include a highest modification time value computed from the modification time values for the records in the dataset of the master data, and wherein the computed slave synchronization test values further include a highest modification time value computed from the modification time values for the records in the dataset of the slave data.

28. The method of claim 23, wherein the received request further includes a minimum time, wherein the modification time value of each respective record of the records included in the dataset of the master data and used to compute the master synchronization test values is greater than or equal to the minimum time, and wherein the modification time value of each respective record of the records included in the dataset of the slave data and used to compute the slave synchronization test values is greater than or equal to the minimum time.

29. The method of claim 23, wherein the update request indicates to add, to delete, or to modify the record of the dataset.

30. The method of claim 23, wherein the request is automatically and periodically generated.

* * * * *